July 30, 1968  R. W. SHIFLEY  3,395,298

CAPACITOR CLAMP

Filed July 5, 1966

INVENTOR:
RALPH W. SHIFLEY
BY
ATTORNEY,

United States Patent Office 3,395,298
Patented July 30, 1968

3,395,298
CAPACITOR CLAMP
Ralph W. Shifley, St. Louis, Mo., assignor to Emerson Electric Co., St. Louis, Mo., a corporation of Missouri
Filed July 5, 1966, Ser. No. 562,574
7 Claims. (Cl. 310—72)

This invention relates to a clamp for a capacitor start electric motor.

The capacitor of a capacitor start motor is conventionally mounted on the outside of the motor on a bracket which includes an upstanding ear with a hole in it. The capacitor itself is conventionally made with a cylindrical, cup-type case, the heavy closed end of which is provided with a boss which fits in the hole in the ear of the bracket. The mounting devices known heretofore have made mounting of the capacitor inside the end shield of the motor difficult.

One of the objects of this invention is to provide a capacitor clamp for an electric motor, which is compact, economical to make, and of such a structure as to permit the mounting of the capacitor on the inside face of an end shield of the motor.

Other objects will become apparent to those skilled in the art in the light of the following description and accompanying drawing.

In accordance with this invention, generally stated, in a capacitor start electric motor having an end shield and a capacitor having a cup-type case with a lip and boss at its closed end defining between them an elongated channel, and a mouth-defining rim at its others end, a clamp is provided formed of stiffly flexible wire stock, which has a closed end part, with a crook shaped complementarily to the channel at the closed end of the capacitor. The crook is seated within the channel and embraces the boss. A central span section of the clamp extends the length of the capacitor and a hook end engages the mouth defining rim of the capacitor. The closed end part and the hook end of the clamp are at opposite ends of the central span section. Means, such, for example, as Tinnerman clips held by screws through the end shield wall, are provided to engage the central span section to hold the clamp to the inside of the end shield.

In the preferred embodiment, the central span section is formed with a step or off-set contiguous each end part, which serves the multiple purpose of providing a longer effective spring arm for the two end sections, cooperating with the fastening means, and, resting against the inner surface of the end shield, to inhibit rocking of the clamp and capacitor. In the preferred embodiment, also, the closed end part has a goose neck between a spring arm and the crook to off-set the crook toward the hook end, and in addition is re-entrantly bent, toward the hook end, to provide a tight, flat, springing clasp of the capacitor between the two end parts.

In the drawing, FIGURE 1 is a view in elevation, looking axially outwardly of a motor, showing an end shield upon the inside surface of which a capacitor is mounted by means of one illustrative embodiment of clamp of this invention;

Figure 1:
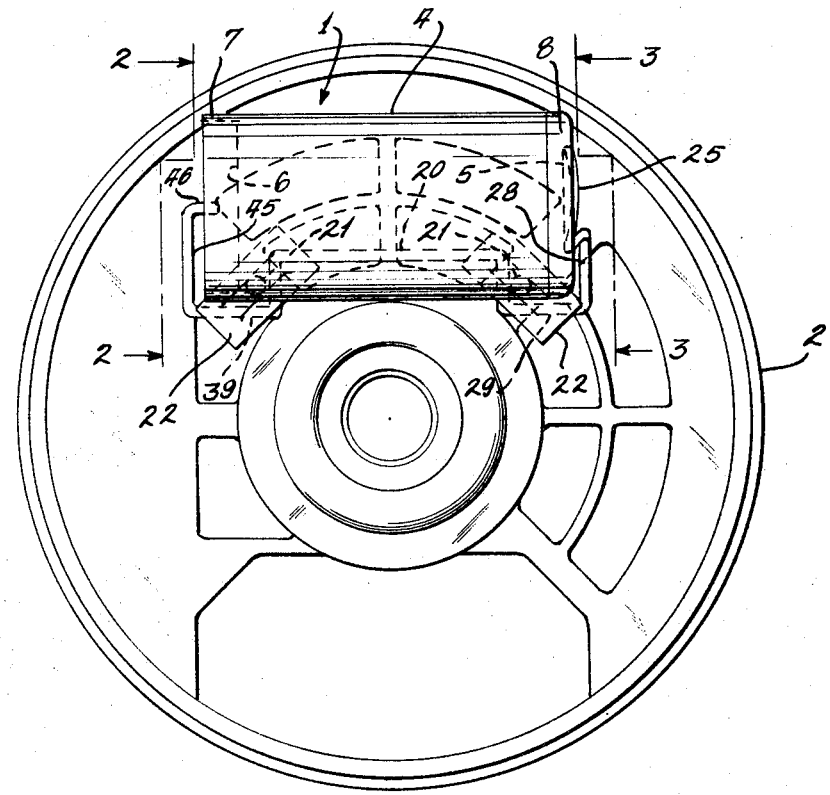
Figure 2:
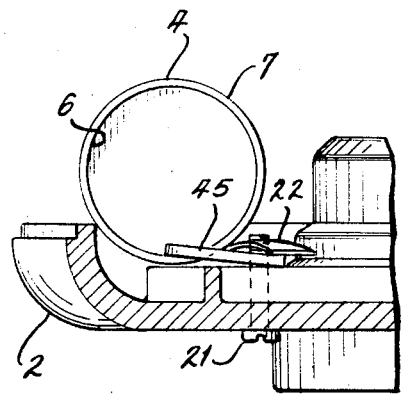
FIGURE 2 is a fragmentary sectional view taken along the line 2—2 of FIGURE 1.
Figure 3:
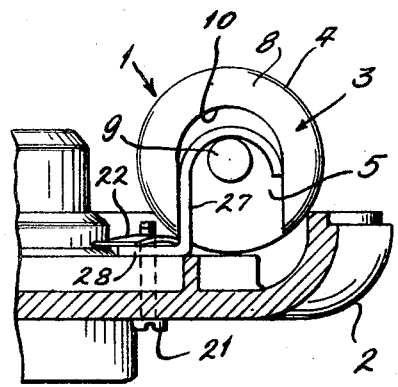
FIGURE 3 is a fragmentary sectional view taken along the line 3—3 of FIGURE 1.
Figure 4:
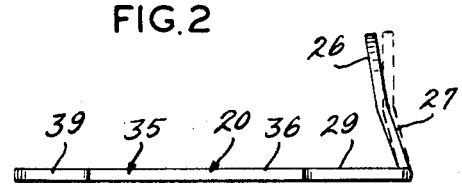
FIGURE 4 is a view in side elevation of the clamp shown in FIGURE 1, without the capacitor, before it is mounted in the end shield.
Figure 5:
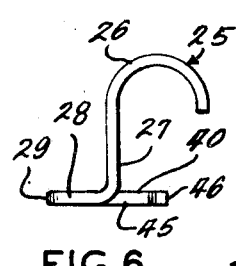
FIGURE 5 is a top plan view of the clamp shown in FIGURE 4.
Figure 6:
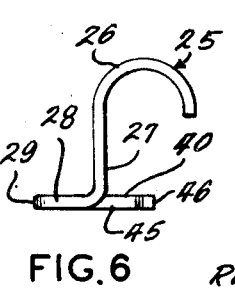
FIGURE 6 is a view in end elevation of the clamp shown in FIGURES 4 and 5.

Referring now to the drawing for one illustrative embodiment of clamp assembly of this invention, reference numeral 1 indicates a capacitor mounted on an inside surface of an end shield 2 of a capacitor start electric motor. The capacitor 1 is a conventional capacitor with a cup-type casing 3, with a cylindrical body 4, a heavy closed end 5, and a mouth end 6, the mouth being defined by a rim 7. At the closed end 5, an interrupted lip 8 and boss 9 define between them a U-shaped channel 10, opening through the interruption in the lip 8.

The capacitor 1 is mounted on the end shield 2 by means of a capacitor clamp 20, machine screws 21 and Tinnerman clips 22. The clamp 20 consists of a closed end part 25, center span section 35, and a hook end part 45. The closed end part includes a crook 26 shaped complementarily to the channel 10 around the end of the boss 9 opposite the interruption in the lip 8, a goose neck 27 and a spring arm 28, connected to the crook 26 by the goose neck 27. The spring arm 28 is part of one leg of a U-shaped step 29 forming a part of the central span section 35. A straight center bar 36 extends from the step 29 to a step 39, the outer leg of which forms part of a hook spring arm 40, which, terminating in an inwardly sharply turned hook 46, makes up the hook section 45.

The spring arms 28 and 40, the steps 29 and 39, and the center bar section 36, all lie in a common plane before the capacitor is mounted in the clamp. The hook end spring arm 40 is initially perpendicular to the center bar 36. In the fabrication of the clamp, the crook 26 and spring arm 28 are initially parallel to the hook spring arm 40, but crook 26 is first off-set a short distance by the goose neck 27 toward the hook end spring arm 40, and then the spring arm 28 is given about 5° bend (i.e. 5° out of parallelism toward the hook end spring arm 40). The distance between the hook end arm 40 and the crook 26 is now less than the distance between the bottom of the channel 10 of the capacitor and the edge of the lip 6 at the other end of the capacitor.

In mounting a capacitor on the inside face of the end shield, the clamp is placed on the inside of the end shield, and held loosely in place by the two Tinnerman speed nuts 22 and two machine screws 21, which are not drawn tight before the capacitor is mounted. The rim of the capacitor is slipped between the hook 46 and the end shield, and the hook and crook ends of the clamp are spread apart manually far enough to permit the crook 26 to clear the end of the capacitor and snap substantially flat into the channel 10, around the arcuate end of the boss 9 and sufficiently far along its sides to prevent rotation of the capacitor. The screws 21 are then tightened. The reach of the spring arms 28 and 40 away from the central span is sufficient to permit the capacitor to lie flat against the inside wall of the end shield. The assembly thus occupies no more space axially of the motor than the diameter of the capacitor. While the clamp holds the capacitor tightly, both against accidental dislodgement and against rotation, it also permits easy removal of the capacitor when removal is desired.

Merely by way of illustration, the clamp can be made of fourteen gauge square spring wire, which is the same as .086 inch square oil tempered wire.

Numerous variations in the construction of the capacitor clamp assembly of this invention within the scope of the appended claims will occur to those skilled in the art in the light of the foregoing disclosure. Merely by way of example, the hook end arm may be bent inwardly to provide additional clamping force; the central span 20 may be given a third, central step or the steps 29 and 39 can be somewhat differently configurated or proportioned, and different mounting means, as, for example, a single strip with two holes to receive thread-forming screws can be used. The crook may be differently shaped, the expression shaped complementarily to the channel is being used to signify that it fits in the channel between the lip and the boss, and not that it is necessarily complemental in the geometric sense. These variations are merely illustrative.

Having thus described the invention, what is claimed and desired to be secured by Letters Patent is:

1. In a capacitor start electric motor having an end shield and a capacitor having a cup-type case with a mouth-defining rim at one end, and a closed other end with a lip and boss at its closed end defining between them an elongated channel, the improvement comprising a clamp formed of stiffly flexible wire stock, said clamp having a closed end part, with a crook seating within the channel at the closed end of the capacitor, a central span section extending the length of said capacitor and a hook end engaging the mouth-defining rim, said closed end part and hook end being at opposite ends of the central span, and means engaging the central span section for holding said clamp to said end shield.

2. The improvement of claim 1 wherein the central span has a plurality of steps at least one of which has an arm forming an extension of the closed end part.

3. The improvement of claim 2 wherein the arm is bent in a direction toward the hook end.

4. The improvement of claim 2 wherein another of said steps has an arm forming an extension of the hook end.

5. The improvement of claim 2 wherein the means engaging the central span section engage the steps.

6. The improvement of claim 1 wherein the closed end part includes a spring arm, a goose neck and a crook, the goose neck being between and connecting the spring arm and the crook, and offsetting the crook from the spring arm in a direction toward the hook end.

7. The improvement of claim 4 wherein the steps project in a common plane in the opposite direction from the arms and the reach of the arms is sufficient to hold the capacitor clear of the central span, whereby the reach of the mounted capacitor with respect to the axis of the motor is substantially the diameter of the capacitor case.

References Cited

UNITED STATES PATENTS

| | | | |
|---|---|---|---|
| 2,003,031 | 5/1935 | Baker | 310—72 |
| 2,015,667 | 10/1935 | Fleming | 310—72 |
| 2,219,495 | 10/1940 | Sleeter | 310—72 |
| 2,748,185 | 5/1956 | Brunke | 310—72 |
| 2,811,057 | 10/1957 | Mollenberg | 310—72 |
| 3,048,722 | 8/1962 | Baron | 310—72 |
| 3,210,457 | 10/1965 | Hancock | 310—72 |
| 3,350,586 | 10/1967 | Otto | 310—71 |

J. D. MILLER, *Primary Examiner.*

UNITED STATES PATENT OFFICE
CERTIFICATE OF CORRECTION

Patent No. 3,395,298                                    July 30, 1968

Ralph W. Shifley

It is certified that error appears in the above identified patent and that said Letters Patent are hereby corrected as shown below:

Column 1, line 31, "others" should read -- other --. Column 2, line 13, after "part 25," insert -- a --. Column 4, line 21, "2,811,057" should read -- 2,811,657 --.

Signed and sealed this 16th day of December 1969.

(SEAL)
Attest:

Edward M. Fletcher, Jr.                           WILLIAM E. SCHUYLER, JR.
Attesting Officer                                     Commissioner of Patents